United States Patent [19] [11] 4,010,226
Crossland et al. [45] Mar. 1, 1977

[54] BLOCK POLYMERS AND THEIR PREPARATION

[75] Inventors: Ronald K. Crossland; Jaroslav G. Balas; Arthur R. Bean, all of Houston, Tex.

[73] Assignee: Shell Oil Company, Houston, Tex.

[22] Filed: July 17, 1975

[21] Appl. No.: 596,774

[52] U.S. Cl. .......................................... 260/880 B
[51] Int. Cl.² ........................................ C08L 9/06
[58] Field of Search .............................. 260/880 B

[56] References Cited

UNITED STATES PATENTS

| | | | |
|---|---|---|---|
| 3,280,084 | 10/1966 | Zelinski | 260/880 B |
| 3,637,554 | 1/1972 | Childers | 260/880 B |
| 3,639,521 | 2/1972 | Hsieh | 260/880 B |
| 3,644,322 | 2/1972 | Farrar | 260/880 B |
| 3,778,490 | 12/1973 | Hsieh | 260/880 B |
| 3,787,510 | 1/1974 | Farrar | 260/94.2 M |
| 3,957,913 | 5/1976 | Roest | 260/880 B |
| 3,985,830 | 10/1976 | Fetters | 260/880 B |

*Primary Examiner*—Paul R. Michl
*Attorney, Agent, or Firm*—Dean F. Vance

[57] ABSTRACT

An improved process for the preparation of branched polymers is provided wherein the individual branches may be selected at will comprising the formation of an anionic polymer of a polymerizable monomer, coupling with a polyvinyl aromatic hydrocarbon and block polymerizing this coupled product with an anionically active polymerizable monomer.

6 Claims, No Drawings

BLOCK POLYMERS AND THEIR PREPARATION

BACKGROUND OF THE INVENTION

This invention is concerned with the preparation of novel branched block copolymers wherein the individual branches may be independently selected. A number of processes have been disclosed in the prior art for the preparation of polymers, particularly block copolymers, and especially for polymers having a non-linear configuration. These include, for example, the process described in U.S. Pat. No. 3,281,383 wherein polyfunctional coupling agents are suggested for the preparation of branched polymers. The process is limited, however, in that the branches are all substantially identical. This place a structural limitation on the variety of products which can be prepared in that the coupled product is determined by the physical limits and properties of the sum of the individual branches. Up to the present time, no process has been published for the preparation of branched polymers in which the individual branches may vary other than in a statistical manner.

In many end uses it would be desirable to provide polymers in which individual portions of the polymeric molecule could be varied at will to provide additional scope in the set of physical properties of the total polymer. For example, it may be desirable for certain end uses to build in extra flexibility, tensile strength, or processability, all of which heretofore have been limited as described above.

A number of items in the prior art have disclosed multifunctional lithium-based initiators which result in linear or branched polymers. The most pertinent of these relative to the present invention are shown in U.S. Pat. No. 3,644,322 and U.S. Pat. 3,787,510. These patents disclose the preparation of multifunctional initiators by forming a monolithium living polymer, and coupling this polymer with a polyvinyl aromatic compound such as divinylbenzene, resulting in the formation of a oligomer having no more than 15 monomeric units per lithium ion. Consequently the patents are correct in referring to this product after its coupling with divinylbenzene as "a multifunctional organic lithium ion initiator." This is due to the fact that the molecular weight, even of the coupled product, is so low that it would serve no useful purpose as a polymer even though it may function as a polymerization initiator.

It is an object of the present invention to provide an improved block polymerization process. It is a further object of the invention to provide a process for the production of branched block copolymers. It is a particular object of the invention to provide a process for the production of branched copolymers wherein a high degree of control over the identity of the individual branches may be exercised. Other objects will become apparent during the following detailed description of the invention.

Statement of the Invention

Now, in accordance with the present invention, an improved polymerization process is provided comprising the following essential steps:

1. polymerizing at least one conjugated diene and/or monoalkenyl aromatic hydrocarbon with a monolithium polymerization initiator to form a monolithio living polymer having an average mole weight of at least about 5,000;
2. coupling this living polymer with a polyalkenyl aromatic hydrocarbon to form coupled polymer associated with or containing more than one lithium ion; and then
3. utilizing this living polymer to block polymerize a conjugated diene and/or a monoalkenyl aromatic hydrocarbon or a monoalkenyl pyridine.

The invention also contemplates termination with ethylene oxide, epichlorohydrin, $CO_2$, vinyl pyridine, etc to yield polar terminated products. A suitable list of terminating agents is provided in U.S. Pat. No. 3,862,077.

Still, in accordance with the present invention, novel branched copolymers are provided which are produced by this process. Furthermore, the invention contemplates the further derivitization of these specific branched polymers such as by hydrogenation, epoxidation, halogenation or carboxylation.

The present invention contemplates particularly the preparation of branched copolymers in which at least 2 of the branches have average molecular weights in excess of about 7,500 and at least 1 other branch having an average molecular weight in excess of about 5,000. These minimum molecular weights are specified so that each of the branches will provide an effective modification of the total spectrum of physical properties of the finished polymer. If these branches are of such a low molecular weight as might be obtained by the polymerization of only about 2–15 monomeric units, the branch would have essentially no effect upon the physical properties of the final polymer.

Several variations on the basic process are contemplated. For example, a still greater degree of control of the physical properties of the final polymer can be chosen by selecting a mixture of monolithio living polymers rather than a single species thereof. Another desirable variation is to form a monolithio living polymer having more than one polymer block such as polystyrene-polybutadiene-Li. Alternatively, a mixture of monomers may be employed in forming a single stage rather than in multiple stages a mixed monolithio living polymer. For example, a mixture of more than one conjugated diene may be utilized in the initial polymerization with a monolithio initiator, or mixtures of at least one conjugated diene with at least one monoalkenyl aromatic hydrocarbon may be employed in this first step. A still further variation in the options available comprises the mixture of two monolithio living polymers, both being made from the same monomer, e.g., butadiene, the polymers varying either in their microstructure or in their average molecular weight.

In the first step of the process, an organo monolithium compound is utilized to initiate the polymerization of either a conjugated diene and/or a monoalkenyl aromatic hydrocarbon. Generally, a conjugated diene will be either butadiene or isoprene, but may include other dienes having up to 12 carbon atoms per molecule. The monoalkenyl-substitute aromatic hydrocarbons include particularly the monocyclic species such as styrene, alpha methyl styrene and tertiary butyl styrene, as well as other hydrocarbons of this class having between 8 and 20 carbon atoms per molecule.

The initial polymerization is normally carried out in an inert hydrocarbon diluent as known in the art, and in the presence of an inert atmosphere. However, structure modifiers such as ethers, thio-ethers or tertiary amines may be present, also as known in the prior art.

The organomonolithium compounds that are employed as initiators for the polymerizable monomers in step one of this process are represented by the formula RLi; wherein R is an aliphatic, cycloaliphatic, or aromatic radical, or combinations thereof, perferably containing from 2 to 20 carbon atoms per molecule. Exemplary of these organomonolithium compounds are ethyllithium, n-propyllithium, isopropyllithium, n - butyllithium, sec-butyllithium, tert - octyllithium, n - decyllithium, n - eicosyllithium, phenyllithium, 2 - naphthyllithium, 4 - butylphenyllithium, 4 - tolyllithium 4 - phenylbutyllithium, cyclohexyllithium, 3,5 - di - n heptylcyclohexyllithium, 4 - cyclopentylbutyllithium, and the like. The alkyllithium compounds are preferred for employment according to this invention, especially those wherein the alkyl group contains from 3 to 10 carbon atoms.

The polyalkenyl aromatic compounds that are employed in the second step of this process and which are added to the reaction product formed in the first step of this invention are those polyvinyl aromatic compounds that have any of the following general formulas:

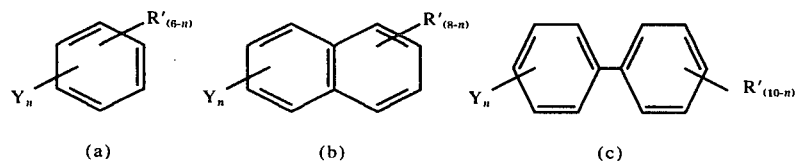

(a)  (b)  (c)

wherein Y is a vinyl group, and wherein each R' is hydrogen or an alky group containing from 1 to 4 carbon atoms with a total of the alkyl substitutents having not more than 12 carbon atoms, and wherein $n$ is an integer of 2 or 3. The vinyl substituents in the above formulas (b) and (c) can be on one or both rings. Exemplary of suitable polyvinyl aromatic compounds are
1,2-divinylbenzene;
1,3-divinylbenzene;
1,4-divinylbenzene;
1,2,4-trivinylbenzene;
1,3-divinylnaphthalene;
1,8-divinylnaphthalene;
1,3,5-trivinylnaphthalene;
2,4-divinylbiphenyl;
3,5,4'-trivinylbiphenyl;
1,2-divinyl-3,4-dimethylbenzene;
1,5,6-trivinyl-3,7-diethylnaphthalene;
1,3-divinyl-4,5,6-tributylnaphthalene;
2,2'-divinyl-4-ethyl-4'-propylbiphenyl;
and the like. Divinyl aromatic hydrocarbons containing up to 26 carbon atoms per molecule are preferred for employment according to this invention; particularly divinylbenzene in either its ortho, meta, or para isomer and commercial divinylbenzene which is a mixture of said isomers is also quite satisfactory.

The mole ratio of lithium initiator and polymerization monomer is adjusted to result in an average molecular weight of the stage 1 intermediate polymer of at least 5,000. As is well known, this type of polymerization proceeds by a growing polymer chain associated on one end with a lithium ion. Thus all of the polymer chains in the present instance have a polymeric unit of at least an average of 5,000, preferably at least 7,500 associated with a single lithium ion.

The temperature for preparing the first polymer is generally in the range of −18° C to 150° C, usually between 10° C and about 90° C. The particular time employed for each step will generally depend upon the temperature and monomer(s) employed and would be in the range of about 5 seconds to 24 hours for each step. In many instances, a period of less than an hour for each step gives satisfactory results. It is to be understood that a longer reaction time would promote branching in the intermediate living polymer but an excess reaction period can lead to crosslinking, i.e., gel formation.

Following preparation of this first species of polymer block, the latter is subjected to coupling with one of the above-identified polyalkenyl aromatic carbons, preferably divinylbenzene. This coupling results in a spectrum of products, coupling two or more of the living polymers of the first stage, each of which is still associated with a lithium ion. The molar ratio of polyalkenyl aromatic carbon to lithium ions is in the range from about 5 to about 0.5. The coupling is conducted usually in the same medium in which initial polymerization was carried out and at temperatures between about 38° C and about 82° C and a reaction time between 5 and 60 minutes.

Following this coupling, the next stage comprises the use of the multilithio intermediate coupled polymer for the further polymerization of the same or a different conjugated diene and/or monoalkenyl aromatic hydrocarbon utilizing the same range of operating conditions as described hereinbefore for the preparation of the first stage polymer. As stated hereinbefore, the flexibility of the present process and the products produced thereby are largely effected in this latter step due to the freedom of choice which may be exercised with respect to monomer selection, molecular weight or microstructure. It is possible, therefore, to produce products which vary from elastomers requiring vulcanization to so-called thermoplastic elastomers, e.g., block copolymers, as well as thermoplastic types such as polystyrene modified by conjugated diene branches. Thus it is evident that there are no critical limitations with respect to choice of particular monomers or of individual branch molecular weights other than those stated hereinabove, namely that at least two of the branches should have an average molecular weight of at least 7,500 and at least one of the remaining branches should have an average molecular weight of at least 5,000. Thus, while modified homopolymers such as branched polyisoprene or branched polystyrene are contemplated, it is particularly contemplated that the present process is directed to block polymers containing polyalkenyl aromatic blocks and conjugated diene polymer blocks, each of substantial molecular weight.

It will be understood by experts in the art that the steps of the above-described process may be repeated if desired to produce polymers of even greater complex branching or of higher molecular weight. Thus, for example, following the second polymerization stage as described above, a second coupling stage may be utilized, employing the above-described class of coupling agents or an entirely different type of coupling agent such as polyhalogenated hydrocarbons, diesters formed between the alcohol need not be monohydric. Others would do equally well although they may not be as available or as easy to purify an alcohol and dicarboxylic acid or polyfunctional coupling agents such as silicon tetrachloride. The products so formed can in some cases be still further modified by additional block polymerization or derivitization.

The coupled products obtained according to the basic process by any of the variations described may be hydrogenated as described in the prior art, preferably so as to reduce at least about 90% of any olefinic bonds in the polymer chains. The resulting products either before or after hydrogenation are particularly useful in footwear, adhesives, wire and cable coatings, automotive parts, and other mechanical goods.

The branched copolymers of this invention, at the end of the second stage of polymerization, are associated with lithium ions. These may remain, if desired, or may be neutralized or removed by known means such as reaction with alcohol.

EXAMPLE I

A first polymer block was formed by polymerization of styrene (20 parts) in cyclohexane (120 parts) using secondary butyl lithium initiator at ambient temperature. The resulting solution of the living polymer was transferred to a reactor containing cyclohexane (255 parts), diethylether (20.4 parts), and butadiene (14 parts). The latter polymerized, forming a polymer block attached to the polystyrene block to form a living block copolymer, having the structure polystyrene polybutadiene · lithium. The temperature of polymerization was 44°–65° C. Three mols of divinylbenzene per mol of lithium were added over a 20 minute period to the solution of the living block copolymer and the copolymer period was then maintained at this temperature for about 30 minutes. Following this, butadiene (14 parts) was added to the living coupled polymer to form additional polybutadiene blocks.

What is claimed is:
1. A polymerization process comprising:
   a. polymerizing at least one polymerizable compound of the group consisting of conjugated dienes having from 4 to 12 carbon atoms and mono alkenyl-substituted aromatic hydrocarbons having from 8 to 20 carbon atoms under polymerization conditions at a temperature between about $-75°$ C and $+150°$ C with a hydrocarbyl monolithium initiator, the proportions of initiator and polymerizable compound being such as to give a monolithium terminated polymer having an average molecular weight of at least about 7,500;
   b. contacting the monolithium terminated polymer with a polyalkenyl aromatic compound at a temperature between about 10° C and about 90° C, whereby a coupled polylithio intermediate polymer is formed; and
   c. block polymerizing therewith at least one polymerizable compound of the group consisting of conjugated dienes, monoalkenyl arenes and monoalkenyl pyrdiene, at a temperature between about $-75°$ C and $+150°$ C each polymer branch so formed having an average molecular weight between about 5,000 to 1,000,000.

2. A process according to claim 1 wherein the polymer of step (a) has the structure A-B-Li wherein A is a polymer block of a monoalkenyl arene and B is a polymer block of a conjugated diene.

3. A process according to claim 1 wherein each polymer branched initiated in step (c) has a structure selected from the group consisting of —A, —B, —B—A and —A—B, wherein A is a polymer block of a monoalkenyl arene and B is a polymer block of a conjugated diene.

4. A process according to claim 1 wherein a step subsequent to step (c) comprises hydrogenation of at least 90% of the olefinic bonds in the polymeric product.

5. A process according to claim 2 wherein the monoalkenyl arene is styrene and the conjugated diene is butadiene.

6. A process according to claim 5 wherein the polymer branch initiated in step (c) is polybutadiene.

* * * * *